United States Patent
Kumar et al.

(10) Patent No.: US 8,712,402 B2
(45) Date of Patent: Apr. 29, 2014

(54) ENABLING IMPROVEMENT IN CELLULAR NETWORK COVERAGE

(75) Inventors: Shiv Kumar, Marlboro, NJ (US); Paritosh Bajpay, Edison, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 138 days.

(21) Appl. No.: 12/782,688

(22) Filed: May 18, 2010

(65) Prior Publication Data

US 2011/0287762 A1 Nov. 24, 2011

(51) Int. Cl.
*H04W 24/00* (2009.01)

(52) U.S. Cl.
USPC ............ 455/424; 455/423; 455/425; 455/429

(58) Field of Classification Search
None
See application file for complete search history.

(56) References Cited

U.S. PATENT DOCUMENTS

| | | | |
|---|---|---|---|
| 6,463,287 B1* | 10/2002 | Wegner | 455/456.1 |
| 6,480,718 B1* | 11/2002 | Tse | 455/446 |
| 2005/0159171 A1* | 7/2005 | Kaneko | 455/456.1 |
| 2007/0049267 A1* | 3/2007 | Kota et al. | 455/423 |
| 2007/0117565 A1* | 5/2007 | Lidbrink | 455/446 |
| 2007/0287460 A1* | 12/2007 | Koo | 455/436 |
| 2009/0104893 A1* | 4/2009 | Adamczyk et al. | 455/412.1 |
| 2009/0157899 A1* | 6/2009 | Gagliardi et al. | 709/235 |
| 2011/0207411 A1* | 8/2011 | Phillips | 455/67.11 |

* cited by examiner

*Primary Examiner* — Suhail Khan
(74) *Attorney, Agent, or Firm* — Abel Law Group, LLP

(57) ABSTRACT

A method that has cellphones report to the cellular network signal strength and location information when the signal strength falls below a chosen threshold. Each cellphone maintains a log file of entries, each of which specifies a location and a signal strength (that is below the chosen threshold) and on a regular basis sends the information in the log file to the cellular network's provider. The provider uses the information sent by the cellphones to identify geographic regions where signal conditions are poor, and that enables the provider to upgrade its network.

19 Claims, 2 Drawing Sheets

ENABLING IMPROVEMENT IN CELLULAR NETWORK COVERAGE

BACKGROUND OF THE INVENTION

This invention relates to cellular networks and, more particularly, to providing connectivity (coverage) information to a provider of a cellular network Cellular networks comprise individual cells that collectively cover a specific geographic area. Each cell is served by a base station, and communication between a cellphone and the network is affected by the cellphone communicating with the base station that is most suited for the point where the cellphone is located. When the cellphone moves and signal conditions change so that another base station is better suited for the communication with the cellphone, the communication is handed off to that other base station.

The wired telecommunications network in the US is quite ubiquitous and has a large capacity. Consequently, perhaps, the pressure to provide the entire landmass of the United States with cellular communication capability was not so great in the past. Additionally, terrain constraints, land ownership rights, changes in population centers, and other factors resulted in cells of the telecommunication network of a provider not always being ideally positioned. The result is gaps in coverage. When a cellphone is at the edges of those gaps communication becomes unreliable, and when a cellphone is within those gaps communication becomes unavailable.

Currently there appears to be no approach for automatically identifying where gaps in coverage are found. A need exists, therefore, to automatically identify those gaps so that the provider can improve service by, for example, installing additional cells.

SUMMARY

The aforementioned need is satisfied and an advance in the art is achieved with a method that has cellphones report to the cellular network the signal strength and location information when the signal strength falls below a chosen threshold. Each cellphone maintains a log file of entries, each of which specifies a location and a signal strength (that is below the chosen threshold) and on a regular basis the cellphone sends the log file information to the cellular network's provider. The provider uses the information sent by the cellphones to identify geographic regions where signal conditions are poor, and that enables the provider to upgrade its network.

DETAILED DESCRIPTION

A simple cellular network arrangement comprises a plurality of geographically dispersed base stations that are connected to a central station, or to a number of interconnected central stations. Each base station includes a transceiver, which allows cellphone within a certain proximity to a base station to communicate with that base station. The area of communication that surrounds a base station is called a cell. A cellular network typically positions the base stations so that the cells partially overlap each other and, ideally, the cells are arranged to completely cover a chosen geographical areas. The protocol between the cellphones and the base stations is such that when a cellphone that is in the midst of a phone call via base station A moves out of the cell of base station A, while moving into the cell of base station B, it is handed off to base station B so that, to the user of the cellphone, there is no awareness that the phone call switched from base station A to base station B. A cellphone that operates within a cellular network's cells can communicate with any other cellphone within the cellular network's cells. Through a connection of the central station(s) to other network or networks—such as cellular networks of other providers, the POTS landline telephone network or the Internet—the cellphone can communicate with any other telephone or a digital device.

Figure 1:
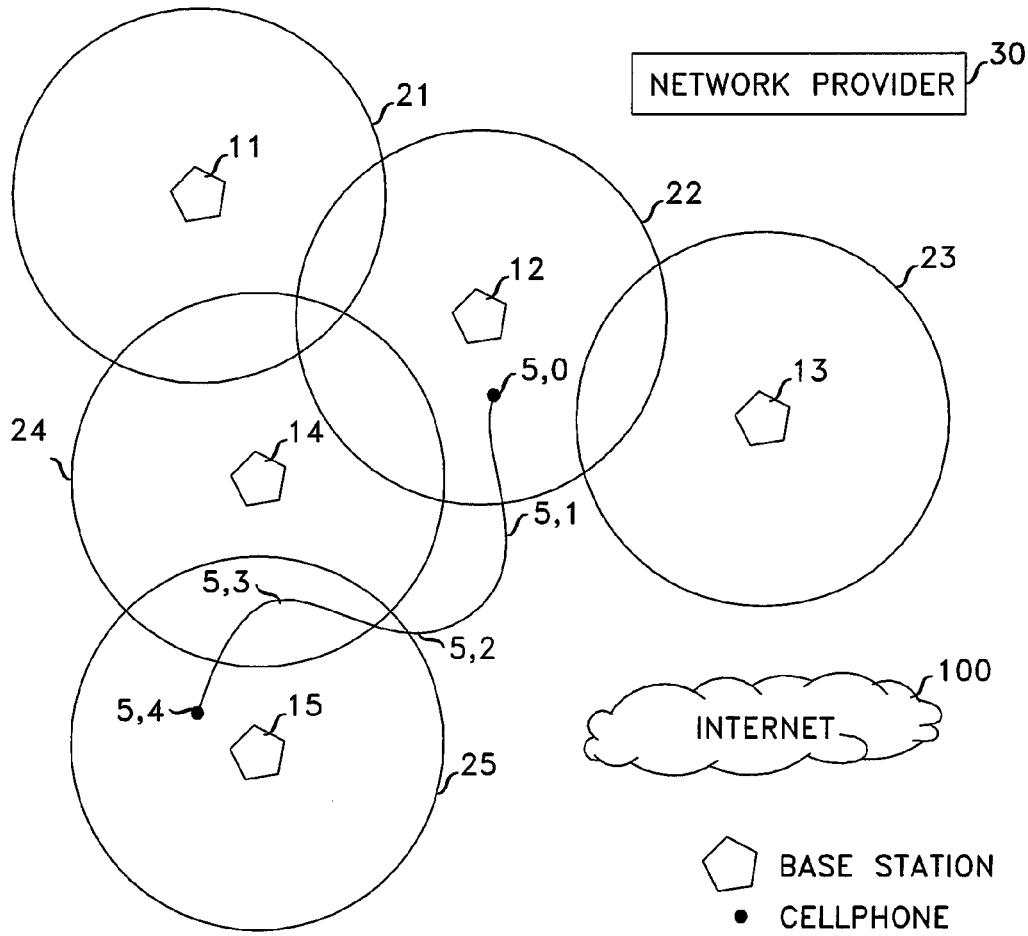
FIG. 1 depicts an illustrative arrangement of cells in a cellular network.

FIG. 1 illustrates such a cellular network of a provider, such as AT&T, with base stations 11, 12, 13, 14, and 15 and cells 21, 22, 23, 24, and 25. The one or more central stations are embodied in module 30, and the one or more other networks are exemplified by the Internet 100. For sake of simplicity, the cells are depicted as circles, but it should be understood that cells are only approximately circular, and they are not delimited by a definite boundary. In reality, the shape and size of the coverage area is a function of encountered obstacles to radio waves (e.g., mountains, buildings), and in all cases the base station's signal strength diminishes with distance from the base station (eventually to an undetectable level). For sake of clarity, the connections of the base stations to the central stations (module 30) and the connections from the central stations to the networks (such as network 100) are not shown.

As indicated above, a cellular network provider ideally positions the base stations so as to completely cover a chosen geographical area, but base stations are not inexpensive and since, both to the public and to the network provider, they provide most benefit in densely populated areas, those are the areas where cells are typically found. Sparsely populated areas sometimes do not have cells, or a sufficient number of them, and consequently areas of poor or no cellphone coverage exist. As a result, a cellphone in the midst of a conversation may happen to move to an area of poor or no coverage and thereby lose the connection. This, of course, is an undesirable situation.

This is illustrated in FIG. 1 with a cellphone at an initial location 5,0, a final cellular location 5,4, and a path that it takes between those locations. It is noted that at location 5,0 coverage is provided by cell 22, at location 5,1 there is no coverage, at location 5,2 there is marginal coverage by cell 25, at location 5,3 there is coverage from both cells 24 and 25, and at location 5,4 coverage is provided by cell 25.

The following discloses a method for automatically and unobtrusively using the cellphones that use the cellular network to supply a Home Network Provider (HNP) with information that identifies locations where HNP's cellular network coverage is poor or non-existent.

The HNP is the cellular network provider for whose benefit the cellphones are modified to execute the process that is disclosed below.

The information about network coverage may relate solely to the cellular network of the NHP, but it can also relate to the cellular networks of other providers. Indeed, the cellphones can execute the disclosed method for the benefit of a number of cellular network providers.

The method disclosed herein provides a benefit to the NHP through use of any cellphone that executes the disclosed method. However, it is advantageous for cellphones to have an embedded Global Positioning System (GPS) unit that is continually aware of the cellphone's global position. In short, the only requirement is that the cellphone includes a module that executes the process of FIG. 2.

Figure 2:
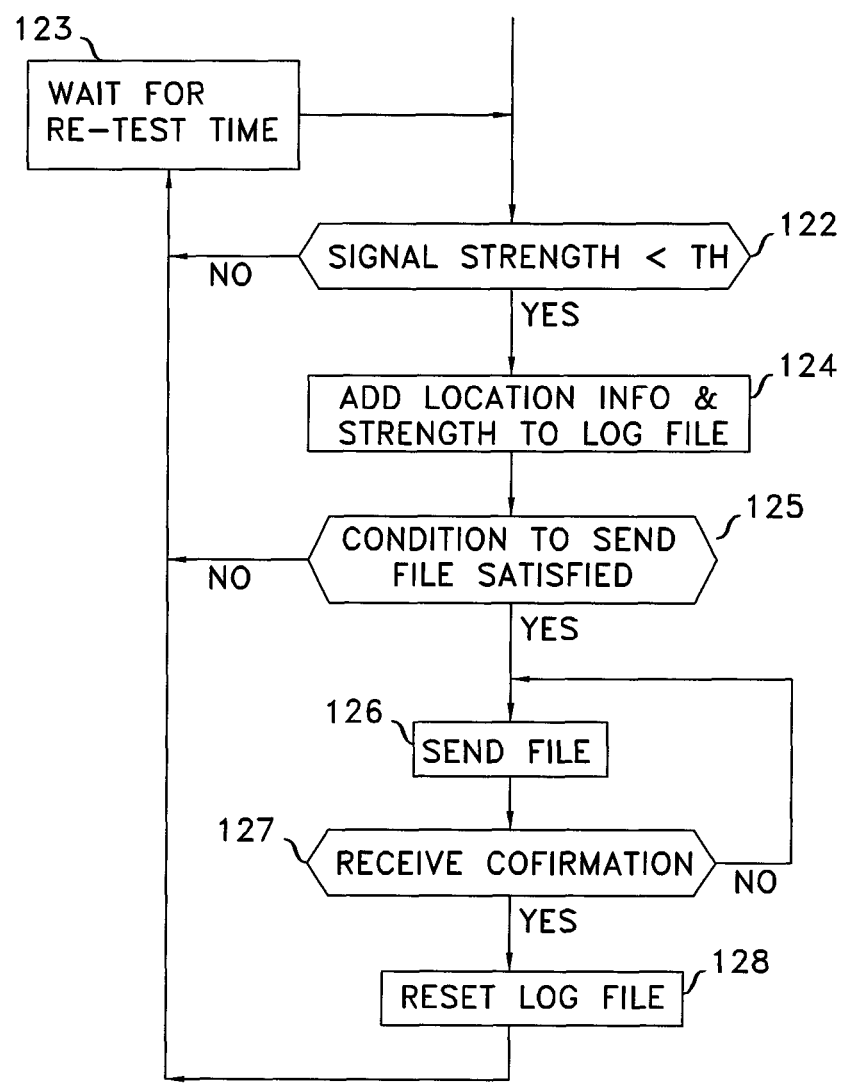
FIG. 2 shows a method in accord with the principles disclosed herein for coverage information that is provided by cellphone to the cellular network.

The FIG. 2 process begins at step 122. As is well known in the art, a cellphone that is "on" (which from a user's standpoint, is ready to receive phone calls) repetitively determines whether it detects the signals of one or more base stations, selects the base station with the strongest signal, and communicates with that base station on a signaling channel; thus informing the base station that the cellphone can be reached by that base station. Step 122 determines whether the signal strength of that base station is below a preselected threshold. If not, it means that the cellphone is within acceptable signal conditions, and control passes to step 123. Step 123 imposes a preselected wait time, for example, 1 minute, and returns control to step 122.

When step 122 determines that the signal strength of the strongest base station is below the preselected threshold, control passes to step 124. Step 124 creates a record that comprises signal strength information and location information and appends that record to a log file.

Ideally, the location information is obtained from a GPS unit that is embedded in the cellphone. In connection with cellphones that do not have an embedded GPS unit, one alternative for the location information is the ID of the base station whose signal strength is being reported. Another alternative is to include the ID of all base stations that are detected by the cellphone.

After appending the created record in the log file, step 124 passes control to step 125, where a decision is made whether the conditions set for forwarding the contents of the log file to the HNP are satisfied. If so, control passes to step 126; otherwise, control returns to step 123.

The condition or conditions for sending the contents of the log file to the HNP are chosen by the implementer of the method. The condition can be simply time of day; for example, "at 12:01 am, or as soon as the cellphone is turned on that day." The condition can be a function of the number of entries in the log; for example when the log file exceeds a predetermined number of entries. The condition can be compound, including the secondary condition that the cellphone must be within the HNP's network. Other conditions can be also incorporated.

Sending out the content of the log file can be done in a number of ways, depending on the functionalities of the cellphone. A cellphone that has no Internet access can send the log file to the HNP via the signaling channel that the base station provides. Most likely, this method is limited to sending the log file when the cellphone is in the HNP's network. Alternatively, the cellphone can initiate a call to a predetermined number (when the cellphone is not otherwise in use) upload the log file, and terminate the call. Cellphones that have connectivity to the Internet can send the log file to the HNP via the Internet.

In the FIG. 2 embodiment, sending step 126 is followed by step 127, which determines whether the cellphone received a confirmation message to the effect that the sent information was received. If a confirmation is not received within a preselected time interval, control returns to step 126. If a confirmation is received, control passes to step 138 which resets the log file. The resetting can be in the form of clearing the entries, in the log file or, alternatively, specifying an end-of-file address relative to a start-of-file address to effectively form a file of zero entries.

Figure 3:
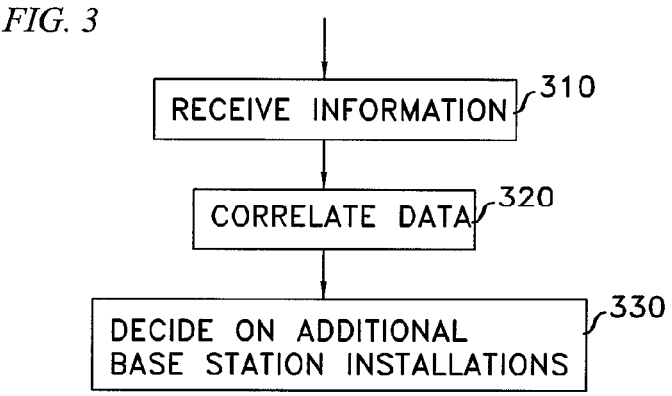
FIG. 3 shows a method for utilizing the information provided by the FIG. 2 method.

FIG. 3 shows the process that is carried out in the HNP's module 30 in connection with the information provided by the cellphones (via the signaling channels, the information channels, or the Internet).

Step 310 collects information from all telephones, step 320 correlates and conditions the received information for a forthcoming decision step, and step 330 is a process, whether automated or executed by an individual, that decides whether and where to install additional base stations in order to maximize benefit for the expenditures made. Illustratively, step 330 plots the information by indicating signal strengths at positions on a medium such as paper or computer monitor that correspond to the location information associated with the indicated signal strengths.

The above discloses the principles of this invention by means of the illustrative FIG. 2 process. Various modification and enhancement are possible, however, without departing from the spirit and scope of this invention. For example, the above discloses that step 122 measures the signal strength of the strongest received base station. Alternatively, steps 122 may be constrained to measure the strength of base stations of only the HNP's network, or step 124 may be constrained to add to the log file only when the cellphone is in the HNP's network or close to it.

An example of an enhancement is to have step 124 maintain distinct log files for the different cellular network providers that the cellphone encounters. The uploading in step 126 would then be of a number of the log files, or only of the file that pertains to the network provider in whose network the cellphone is located. This suggests, of course, multiple uploading of information, at different times.

Another example of an enhancement is to make the threshold of step 122, the condition for sending the log file, and/or the time granularity provided by step 123 alterable, for example, by the HNP downloading information to the FIG. 2 process of each cellphone that enters the HNP's network.

The invention claimed is:

1. A method comprising:
   on entering a network of a Home Network Provider (HNP), a cell phone receiving a signal strength threshold and time information from the HNP;
   receiving signals at the cellphone from n base stations of the Home Network Provider (HNP), where n≥1;
   determining signal strength of one of said signals received from said n base stations;
   in response to said signal strength being below the signal strength threshold, appending to a log file information about said signal strength and information about geographic location of said cellphone;
   said cellphone sending said log file in response to one or more conditions being satisfied, the one or more conditions including that a number of entries in said log file is above a predetermined number;
   when said sending is deemed successful by receiving a confirmation message within a preselected time period, said cell phone resetting said log file and if said confirmation message is not received within said preselected time period, resending said log file; and
   in response to said signal strength being above the signal strength threshold waiting to redetermine signal strength according to the time information provided by the Home Network Provider.

2. The method of claim 1 where said one of said signals whose strength is determined is the strongest of said received signals.

3. The method of claim 1 where said one of said signals whose strength is determined is the strongest of said received signals that belongs to said network of said HNP.

4. The method of claim 1 where said determining and appending are executed only when said cellphone is in, or approximately in, the network of said HNP.

5. The method of claim 1 where said step of appending is executed only when said cellphone is in, or approximately in, the network of said HNP.

6. The method of claim 1 where said step of sending sends said log file to said HNP.

7. The method of claim 1 where said information about geographic location is global position of said cellphone.

8. The method of claim 1 where said information about geographic location is identification of the base station whose signal strength is determined.

9. The method of claim 1 where said information about geographic location is identification of two or more of the n base stations whose signals are received in said receiving.

10. The method of claim 1 where said one or more conditions includes time of day.

11. The method of claim 1 where said one or more conditions includes location of said cellphone.

12. The method of claim 1 where said resetting erases information in said log file.

13. The method of claim 1 where said resetting alters addressing information of a memory that contains said log file.

14. The method of claim 1 where said threshold is alterable.

15. The method of claim 1 where said one or more conditions are alterable.

16. The method of claim 1 where said sending is to said HNP, and said HNP executing the steps of:
   receiving said log file from said cellphone and log files from other cellphones, thereby creating a collection of log files;
   analyzing said collection of log files to arrive at identification of geographic locations where improvement in network coverage may advantageously be made; and
   making a determination as to where cellular network facilities are to be installed.

17. The method of claim 1 wherein said one or more conditions include said cellphone being turned on.

18. A method comprising:
   on entering a network of a Home Network Provider (HNP), a cell phone receiving a signal strength threshold and time information;
   determining signal strength of one of a plurality of signals received from one or more base stations of the home network provider;
   in response to said signal strength being below said signal strength threshold, appending to a log file information about said signal strength and information about geographic location of said cellphone;
   said cellphone sending said log file in response to one or more conditions being satisfied, the one or more conditions including that a number of entries in said log file is above a predetermined number; and
   in response to said signal strength being above the signal strength threshold, waiting to redetermine signal strength according to the time information received by the cell phone.

19. A method comprising:
   on entering a network of a Home Network Provider (HNP), a cell phone receiving a signal strength threshold and time information from the HNP;
   receiving signals at the cellphone from one or more base stations of the Home Network Provider (HNP);
   determining signal strength of one of said signals received from said one or more base stations;
   in response to the determined signal strength being below the signal strength threshold, appending to a log file information about said signal strength and information about geographic location of said cellphone;
   said cellphone sending said log file in response to one or more conditions being satisfied, and
   in response to said signal strength being above the signal strength threshold, waiting to redetermine signal strength according to the time information provided by the Home Network Provider.

* * * * *